United States Patent [19]
Kropscott et al.

[11] 3,789,100
[45] Jan. 29, 1974

[54] PROCESS FOR MOLDING OBJECTS FROM RAPID-SETTING POLYURETHANE COMPOSITIONS

[75] Inventors: Earle L. Kropscott; Gerald R. Wittenbach, both of Lake Jackson, Tex.

[73] Assignee: The Dow Chemical Company, Midland, Mich.

[22] Filed: June 19, 1972

[21] Appl. No.: 264,058

[52] U.S. Cl.............. 264/219, 264/317, 264/318, 264/337, 264/DIG. 44
[51] Int. Cl. .................. B29c 1/02, B29c 1/08
[58] Field of Search............... 264/317, 337–338, 264/313, DIG. 44, 221–225, 318, 321, 334, 331, 219; 249/134; 260/2.5 BC, 2.5 BD

[56] References Cited
UNITED STATES PATENTS

| | | | |
|---|---|---|---|
| 3,378,511 | 4/1968 | Newton | 260/31.8 N |
| 3,515,779 | 6/1970 | Jones | 249/134 |
| 2,722,719 | 11/1955 | Altstadter | 264/321 |
| 3,632,724 | 1/1972 | Hilgeman, Jr. | 264/228 |

Primary Examiner—Robert F. White
Assistant Examiner—Gene Auville
Attorney, Agent, or Firm—William M. Yates et al.

[57] ABSTRACT

Molded polyurethane objects are prepared from rapid-setting polyurethane compositions employing molds prepared from foamed polymers of vinyl aromatic compounds. The molds retain their shape and dimensions sufficiently for the polyurethane composition to solidify and then the mold distorts and shrinks away from the molded object.

8 Claims, No Drawings

PROCESS FOR MOLDING OBJECTS FROM RAPID-SETTING POLYURETHANE COMPOSITIONS

The present invention relates to a process for preparing molded objects from rapid-setting polyurethane compositions.

Polyurethane molded objects are usually prepared employing molds constructed of wood, metal, non-foamed thermoplastic such as polyethylene or polypropylene, reinforced thermoset resins such as glass reinforced epoxy resins and the like. However, component parts or objects having intricate shapes and undercuttings must usually be machined because they cannot be readily removed from a mold.

It has now been discovered that polyurethane objects having intricate or complicated designs or configurations can be prepared from rapid-setting polyurethane foam employing molds constructed of foamed vinyl aromatic polymers and copolymers.

These molds possess the ability to retain their shape for a time sufficient for the rapid-setting polyurethane compositions to rapidly solidify, i.e. within a period of from about 20 seconds to about 5 minutes and preferably from about 30 seconds to about 100 seconds. Then, as the heat continues to build up within the polyurethane composition, such heat is sufficiently transferred to the foamed vinyl aromatic polymer mold such that the mold shrinks away from the solidified cast or molded object. By this time, the molded article has achieved a sufficient strength to maintain its shape.

Suitable mold materials include the foamed polymers of such vinyl aromatic compounds as those represented by the formula

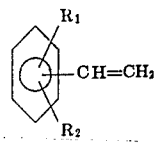

wherein each $R_1$ and $R_2$ are, independently, hydrogen, an alkyl or haloalkyl group having from one to about four carbon atoms, or a halogen atom including polymers of such compounds as styrene, methyl styrene, chlorostyrene, chloromethylstyrene, ethyl styrene, butylstyrene, propyl styrene, bromostyrene, bromomethyl styrene, mixtures thereof and the like.

Also included are copolymers of any of the above mentioned vinyl aromatic compounds or mixtures thereof with such vinyl monomers as acrylonitrile, methyl methacrylate, methacrylonitrile, butyl acrylate, 2-ethylhexyl acrylate, mixtures thereof and the like.

Particularly suitable mold materials for use in the process of the present invention include foamed copolymers comprising a major proportion, of a vinyl aromatic compound or mixture of such compounds with a minor proportion of a vinyl monomer, or mixture of such monomers.

Any polyurethane composition which rapidly solidifies without the application of any external source of heat and possesses the ability of maintaining its shape without any means of external support within a period of about 5 minutes and preferably within a period of about 3 minutes or less. Such times are measured from the time all of the components are mixed together wherein the catalyst is usually the last component to be added.

The particular composition of the polyurethane is not significant so long as it rapidly solidifies and possesses the above mentioned requirement to hold its shape after an elapse of the times previously described.

Suitable polyurethane compositions from which objects can be molded by the process of the present invention include those of U.S. Pat. No. 3,378,511 and coassigned, copending applications "NON-ELASTOMERIC POLYURETHANE COMPOSITIONS" by F. Olstowski and D. B. Parrish, Ser. No. 179,149 filed Sept. 9, 1971, now abandoned; "RAPID-SETTING POLYURETHANE ELASTOMER COMPOSITIONS" by D. B. Parrish and F. Olstowski, Ser. No. 191,344, filed Oct. 21, 1971, now U. S. Pat. No. 3,725,355; "RIGID POLYURETHANE COMPOSITIONS" by F. Olstowski and D. B. Parrish, Ser. No. 191,343, filed Oct. 21, 1971, now U. S. Pat. No. 3,746,692; "RAPID-SETTING POLYURETHANE COMPOSITIONS" by E. E. Jones, F. Olstowski and D. B. Parrish, Ser. No. 195,498, filed Nov. 3, 1971, now U. S. Pat. No. 3,726,827; "RAPID SETTING POLYURETHANES FROM DIOLS AND POLYFUNCTIONAL ISOCYANATES" by F. Olstowski, Ser. No. 205,697, filed Dec. 7, 1971, now abandoned; "SOLID, RAPID-SETTING, RIGID POLYURETHANES," by F. Olstowski, Ser. No. 221,784, filed Jan. 28, 1972, now abandoned; "FLUID RAPID-SETTING URETHANE COMPOSITIONS" by F. Olstowski and D. B. Parrish, Ser. No. 246,903, filed Apr. 24, 1972; "POLYURETHANE FOAMS BLOWN WITH WATER VAPOR" by F. Olstowski, Ser. No. 246,922, filed Apr. 24, 1972; and "POLYURETHANE FOAMS FROM SOLID FOAMING AGENT" by F. Olstowski and D. B. Parrish, Ser. no. 247,030, filed Apr. 24, 1972.

The following examples are illustrative of the present invention but are not to be construed as to limiting the scope thereof in any manner.

The following definitions apply to the components employed in the following examples.

Polyol A was the reaction product of glycerine with propylene oxide in a molar ratio of about 1:3, respectively and having a molecular weight of about 260.

Prepolymer A was the reaction product of Polyol A with an excess of an 80/20 mixture of 2,4- and 2,6-toluene diisocyanate and having about 30% free NCO by weight.

EXAMPLE 1

A mixture consisting of
2830 grams of Prepolymer A
2270 grams of dioctyl phthalate
c 1707 grams of Polyol A
was prepared to which was added and mixed 17 grams of stannous octoate catalyst. The resultant mixture was then poured into an open polystyrene foam mold having a wall thickness of about 1 ½ inches and a cavity in the general configuration of a pump base having the dimensions 29 × 12 × 3 ½ inch. Within about 30 seconds after catalyst addition, the mixture suddenly solidified and within 5 minutes after catalyst addition the mold shrank away from the rigid polyurethane casting which maintained the general configuration of the mold cavity.

EXAMPLE 2

A mixture consisting of
408 grams of Prepolymer A
326 grams of dioctyl phthalate
246 grams of Polyol A
was prepared to which was added and mixed 2.5 grams of stannous octoate catalyst. The resultant mixture was then poured into and around a polystyrene foam mold having a wall thickness of about ⅛ inch and a cavity in the general configuration of a drinking cup having the approximate dimensions of 3 ¼ inch high, top diameter of 2 ¾ inches and bottom diameter of 2 inches, suspended in a paperboard container about 5 inches high, a top diameter of about 4 ½ inches and a bottom diameter of about 4 inches. Within about 30 seconds after catalyst addition, the mixture suddenly solidified and within 5 minutes after catalyst addition the mold shrank away from the rigid polyurethane which maintained the general configuration of the mold cavity. The drinking cup was reduced to droplets of beads which clung to the sides of the molded objects. The droplets were easily removed by a slight brushing motion.

EXAMPLE 3

A mixture consisting of
146 grams of Prepolymer A
117 grams of dioctyl phthalate
87.8 grams of Polyol A
was prepared to which was added and mixed 0.9 grams of stannous octoate catalyst. The resultant mixture was then poured around a polystyrene foam cube having a dimension on each side of about 1½ inches, a density of about 6 lb./ft$^3$ which was suspended in a paperboard container about 5 inches high, a top diameter of about 4 ½ inches and a bottom diameter of about 4 inches. Within about 30 seconds after catalyst addition, the mixture suddenly solidified and within 5 minutes after catalyst addition the mold shrank away from the rigid polyurethane which maintained the general configuration of the mold and upon cutting the cast object through the center, the 1 ½ inches polystyrene foam cube had shrunk to about ½ × ¾ inch while the cavity in the cast object was about 1 ½ × 1 ½ × 1 ½ inches.

EXAMPLE 4

A mixture consisting of
542 grams of Prepolymer A
433 grams of dioctyl phthalate
326 grams of Polyol A was prepared to which was added and mixed 3.3 grams of stannous octoate catalyst. The resultant mixture was then pumped into the bottom of a polystyrene foam mold having a wall thickness of about 1 ½ inches and a cavity in the general configuration of a grating. The mold cavity was prepared by sawing 3/16 × 1 inch grooves in a polystyrene foam board. The ends and top were made from a polystyrene foam block. Within about 30 seconds after catalyst addition, the mixture suddenly solidified and within 5 minutes after catalyst addition the mold shrank away from the rigid polyurethane which maintained the general configuration of the mold cavity.

EXAMPLE 5

A mixture consisting of
164 grams of prepolymer a
117 grams of dioctyl phthalate
87.8 grams of Polyol A
was prepared to which was added and mixed 0.9 grams of stannous octoate catalyst. The resultant mixture was then poured around a 63% styrene, 27% acrylonitrile copolymer foam cube having a dimension of each side of about 1 ¾ inches which was suspended in a paperboard container about 5 inches high, a top diameter of about 4 ½ inches and a bottom diameter of about 4 inches. Within about 30 seconds after catalyst addition, the mixture suddenly solidified and within 5 minutes after catalyst addition the mold shrank away from the rigid polyurethane which maintained the general configuration of the mold and upon cutting the cast object through the center, the 1 ¾ inches foam cube had shrunk to about 1 × 1 × ¾ inches while the cavity in the cast object was about 1 ¾ × 1 ¾ × 1 ¾ inches.

We claim:

1. A process for the preparation of molded polyurethane objects which comprises
   A. preparing a mold of the desired configuration from a foamed polymer of a vinyl aromatic compound;
   B. filling the mold with a rapid-setting polyurethane composition, allowing said composition to rapidly solidify so as to maintain the shape provided by said mold without any external source of heat and any external support means within a period of less than about 5 minutes and causing the mold to distort and shrink away from the solidified object due to heat from the exothermic reaction of the polyurethane formation;
   C. removing the molded object from the remaining portion of the mold.

2. The process of claim 2 wherein said polyurethane composition rapidly solidifies and maintains the shape provided by the mold within less than about 3 minutes.

3. The process of claim 1 wherein the vinyl aromatic compound is a compound represented by the formula

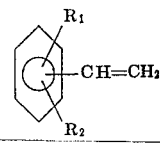

wherein each $R_1$ and $R_2$ are independently, hydrogen, alkyl or haloalkyl groups having from one to about four carbon atoms or a halogen atom.

4. The process of claim 3 wherein said polymer is a copolymer of any two or more of such vinyl aromatic compounds.

5. The process of claim 3 wherein said polymer is polystyrene.

6. The process of claim 3 wherein said polymer is a copolymer comprising in major proportion a vinyl aromatic compound or mixture of vinyl aromatic compounds and a minor portion of a vinyl monomer or mixture of vinyl monomers.

7. The process of claim 6 wherein said vinyl monomer is acrylonitrile and the vinyl aromatic compound is styrene.

8. The process of claim 7 wherein said polymer comprises 27% acrylonitrile and 63% styrene.

* * * * *

PO-1050
(5/69)

UNITED STATES PATENT OFFICE
CERTIFICATE OF CORRECTION

Patent No.     3,789,100        Dated   Jan. 29, 1974

Inventor(s)    Earle L. Kropscott and Gerald R. Wittenbach

It is certified that error appears in the above-identified patent and that said Letters Patent are hereby corrected as shown below:

Col. 2, 1. 56, delete "c".

Col. 3, 1. 46, change "1/2 x 3/4" to read --1/2 x 3/4 x 3/4--

Col. 4, 1. 37, change "Claim 2" to read --Claim 1--.

Signed and sealed this 10th day of December 1974.

(SEAL)
Attest:

McCOY M. GIBSON JR.            C. MARSHALL DANN
Attesting Officer              Commissioner of Patents